United States Patent [19]
Craft, Jr.

[11] Patent Number: 6,061,975
[45] Date of Patent: May 16, 2000

[54] TELECOMMUNICATIONS EQUIPMENT ENCLOSURE SYSTEM

[75] Inventor: Thomas Francis Craft, Jr., Hackettstown, N.J.

[73] Assignee: Lucent Technologies, Inc., Murray Hill, N.J.

[21] Appl. No.: 09/096,921

[22] Filed: Jun. 12, 1998

[51] Int. Cl.[7] .................................................. E04H 5/02
[52] U.S. Cl. .......................... 52/169.1; 220/484; 405/303
[58] Field of Search ................................ 52/169.1, 169.6, 52/67; 220/8, 484; 174/37, 38, 39; 405/303

[56] References Cited

U.S. PATENT DOCUMENTS

| | | | |
|---|---|---|---|
| 2,247,936 | 7/1941 | Bishop | 220/8 |
| 3,008,435 | 11/1961 | Dupuy | 52/169.6 |
| 3,672,103 | 6/1972 | Kost | 52/169.6 |
| 5,653,559 | 8/1997 | Stigg et al. | 220/484 |

*Primary Examiner*—Michael Safavi
*Attorney, Agent, or Firm*—Duane, Morris & Heckscher LLP

[57] ABSTRACT

A subterranean outside plant telecommunications equipment enclosure system including a substantially water-tight containing capsule slidably and rotatably received within a vertical underground sleeve. The capsule is selectively positionable into a first upwardly projecting position with respect to the sleeve and a second storage position within the sleeve. The system provides easy access for servicing and prevents binding of telecommunications cables connected to the capsule.

10 Claims, 2 Drawing Sheets

TELECOMMUNICATIONS EQUIPMENT ENCLOSURE SYSTEM

FIELD OF THE INVENTION

This invention relates in general to the protection of telecommunications equipment and in particular to systems for enclosing telecommunications equipment.

BACKGROUND OF THE INVENTION

Several enclosure systems are known which protect "outside plant" telecommunications equipment. Outside plant telecommunications equipment or products comprise that portion of a telecommunications equipment network which is located outdoors of buildings which are served by the network. Typical outside plant products include telephone poles and the above-ground wires, cables, connections equipment and signal processing equipment supported thereby. By contrast, "inside plant" is that portion of the telecommunications equipment network located indoors of the buildings served by the network.

Oftentimes outside plant products may be disposed entirely or substantially entirely underground. Certain sites on the outside plant network commonly known as "feeders" or "feeds" link the outside plant with the inside plant. A typical feed may include, without limitation, cables, cable terminations and electronics for converting electrical or optical signals carried by the outside plant into electrical signals which are compatible with the indoor plant equipment.

Existing feeds include box-like enclosures which house the feed electronics. The feed boxes may be deployed on pedestals, poles, or stands, or they may be buried as underground vaults.

The power densities of outside plant equipment are generally quite high and generate a great deal of heat which necessitates that the electronics be housed in a relatively stable and cool environment for proper operation. As such, feed boxes located above ground may require expensive cooling or other temperature stabilization measures when used in particularly sunny climates or other areas prone to relatively high temperatures. Furthermore, aboveground feed boxes are susceptible to vandalism, vehicular and environmental damage.

Underground feed boxes are less susceptible to vandalism and vehicular damage and provide cooler and more stable thermal environments for the enclosed electronics. However, the electronics of existing underground boxes are not themselves sealed. The electronics are therefore vulnerable to water seepage through the feed boxes which are routinely exposed to high levels of ground moisture. And, in instances of flooding, underground feed boxes may be submerged for long periods of time.

When maintenance is required, it is sometimes difficult to locate an underground box. Additionally, in many instances, it is difficult if not impossible for a worker to service the feed electronics when stored underground. In such case, it is necessary to dig up the box and raise it to the ground surface which could result in damage to the box and/or the connecting cables leading to and from the box.

In typical installations of aboveground or underground feed boxes, a trench is dug in which the cable leading to the electronics is installed. A backhoe then digs a hole for the underground feed box or for installing the aboveground feed box pedestal foundation. In the case of underground installations, the cables previously laid in the trench are run through the box and connected to the appropriate connectors or terminations in the box. The box is then placed into the ditch and covered with dirt. In the case of aboveground installations, the pedestal is built, the cables are run up through the pedestal, and the electronics-containing feed box is installed on the pedestal with the cable running through the box and connected to appropriate connectors within the box.

Additionally, the substantially square shape of existing underground feed boxes render it somewhat difficult to effectively seal a lid to the box. Further, when lowering the box into the ground, the cables leading to the box may become bound or kinked under the box. This may detrimentally affect the signal transmission performance of the cable and possible require removal and reinstallation of the box. Moreover, the orientations of the electronics in underground feed boxes and similar outside plant enclosures is not standardized. The electronics are unsealed and typically disposed horizontally in the box. Since cables may enter several sides of the box, expensive cable fittings or other sealing measures must be taken to avoid water ingress.

SUMMARY OF THE INVENTION

The present invention provides a system including a method and apparatus for enclosing telecommunications outside plant products. The system includes a substantially rigid sleeve adapted for underground installation and an electronics-containing capsule movable within the sleeve.

To overcome the problems of servicing accessibility, moisture encroachment and cable binding, among others, typically associated with underground telecommunications enclosures, the sleeve and capsule are preferably cylindrical in shape and substantially vertical in orientation. The capsule is selectively positionable into an access position where it projects upwardly from the sleeve and a storage position where it is substantially surrounded by the sleeve. The sleeve and capsule are preferably provided with cooperating means for rotating the capsule relative to the sleeve as the sleeve moves vertically into and out of the sleeve. Rotation of the capsule promotes beneficial coiling as opposed to harmful kinking of the cable portions contained within the sleeve.

DETAILED DESCRIPTION OF THE INVENTION

Figure 1:
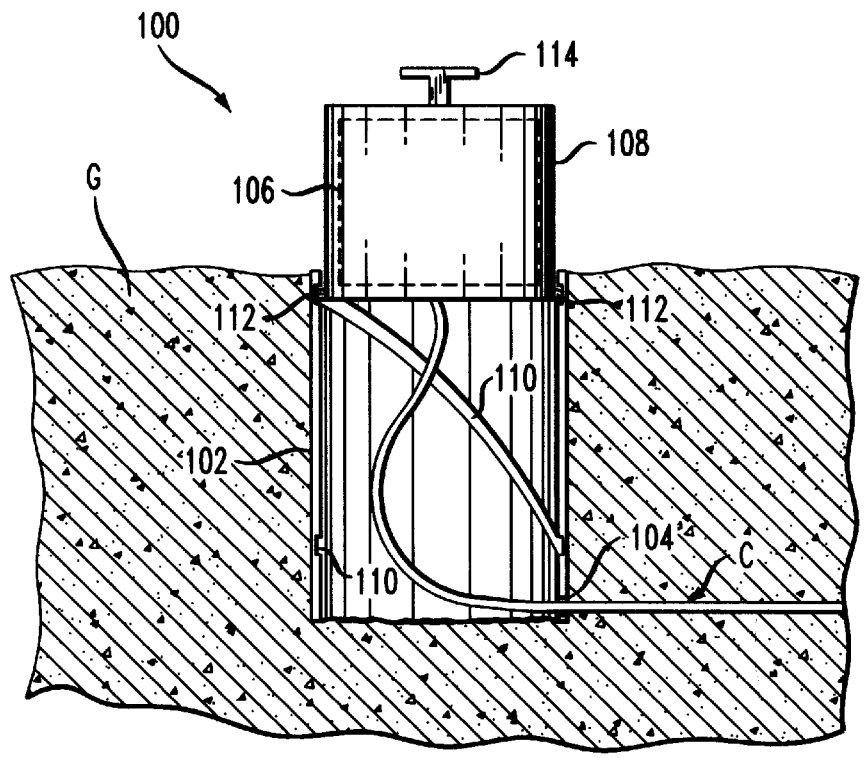
FIG. 1 is a side elevation view, in partial section, of a telecommunications equipment enclosure system in accordance with the present invention in a first operational disposition.
Figure 2:
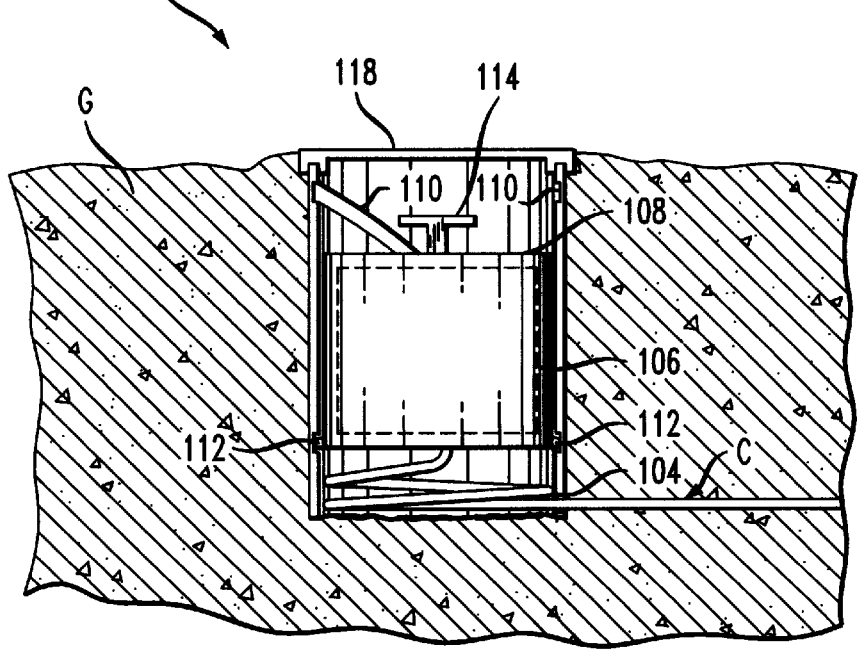
FIG. 2 is a view similar to FIG. 1 of a telecommunications equipment enclosure system in accordance with the present invention in a second operational disposition.

FIGS. 1 and 2 depict a subterranean outside plant telecommunications enclosure system according to the present invention, generally identified by reference numeral 100, installed in surrounding soil or ground G. Installation of system 100 is generally as follows.

Initially, a trench of desired length, width and depth is dug by suitable machinery such as a backhoe or the like. One or more telecommunication cables, identified generally by reference character C in FIGS. 1 and 2, are then laid in the trench. As is known, cable C typically includes bundles of copper wires or fiber optic filaments adapted to transmit electrical or optical signals. The signals are processed by suitable electronics housed within a feed box or other outside plant telecommunications enclosure system such as, for example, system 100 whereby the signals are converted into signals which are compatible with the inside plant to which the system may be connected.

Following placement of cable C, a cylindrical hole is dug having a diameter and depth sufficient to accommodate a sleeve 102 of system 100. Sleeve 102 is constructed as a substantially circular cylindrical tube which may have an enclosed bottom or, as illustrated, an open bottom.

Because of the cylindrical shape of the components of system 100, the cylindrical hole for accommodating the system may be easily dug by portable or truck mounted auger rather than a backhoe as is generally required for installation of presently known feed boxes and related equipment. For a typical single family residential feed box installation, for example, the sleeve 102 may be about 16 to about 24 inches in height and about 8 to about 16 inches in diameter. It will be understood that these dimensions may vary considerably depending upon the intended service application of system 100. Sleeve 102 may be fabricated from any suitable substantially rigid metallic or plastic material, although about 0.10 to about 0.25 inch thick crystalline thermoplastic polyester is preferred for its strength and corrosion resistance properties.

Cable C is then run through the open bottom or, as illustrated, an opening 104 provided in the side of sleeve 102. The sleeve 102 is then pressed into the ground G with a length of cable C lying within the installed sleeve. Thereafter, the free end of cable C is connected to suitable telephony, data, video, etc. transmission, conversion and or processing electronics identified generally by reference numeral 106 contained within a capsule 108. Unlike the electronics housed within existing feed boxes which are unsealed, capsule 108 is a protective canister which virtually seals the electronics from water encroachment and thereby obviating the need for sleeve 102 to have an enclosed bottom.

Figure 3:
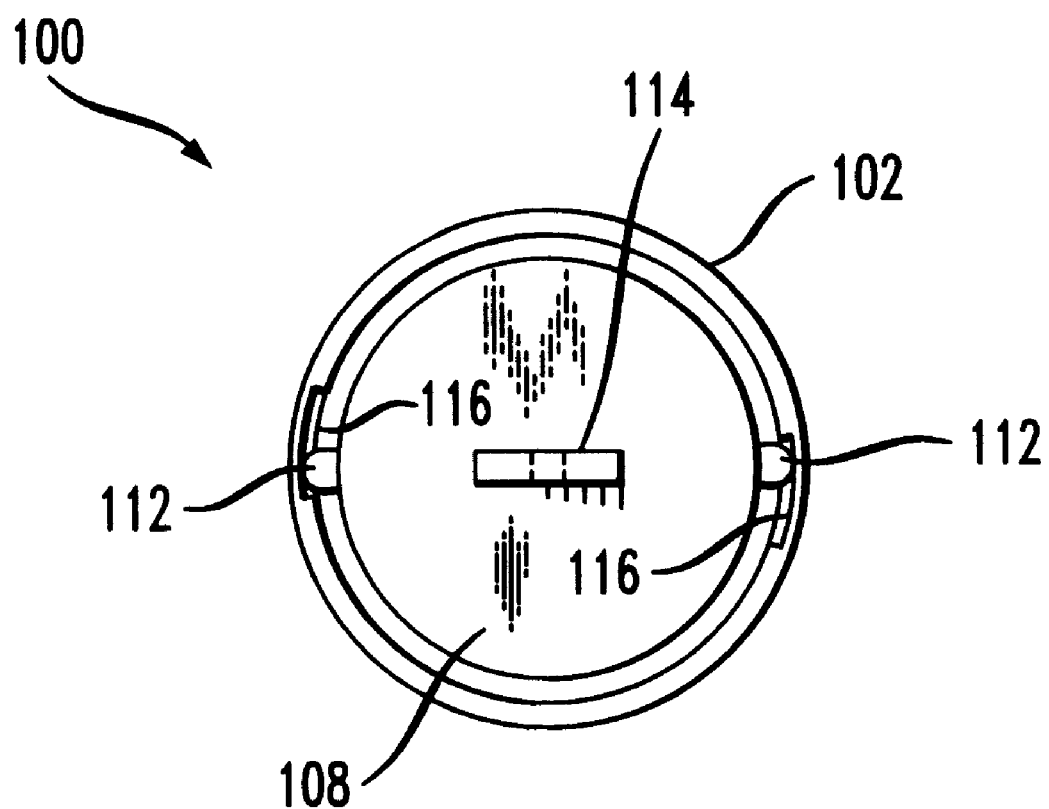
FIG. 3 is a top plan view of the telecommunications equipment enclosure system shown in FIG. 1.

Capsule 108 is cylindrical in shape and preferably constructed of the same or similar material as sleeve 102. As seen in FIG. 3, the diameter of capsule 108 is preferably selected such that the capsule may be readily slidable within the sleeve. The sleeve 102 and capsule 108 are preferably provided with cooperating means for enabling selective disposition of the capsule into a first upwardly projecting access position with respect to the sleeve and a second storage position within the sleeve. Such cooperating means further preferably include means for causing rotation of the capsule 108 within the sleeve 102 as the capsule is moved from its upwardly projecting first position (FIG. 1) to its storage position (FIG. 2), and vice versa. For example, the cooperating means may include suitable cam surface means provided on one of the sleeve 102 and capsule 108 which is engaged by cam follower means provided on the other of the sleeve and capsule. According to a presently preferred embodiment, the cam surface means is constructed as at least one or, more preferably, a plurality of helical grooves 110 formed in the interior of the circumferential side wall of sleeve 102. Accordingly, a presently preferred cam follower means is constructed as one or more protrusions 112 provided on the exterior of the circumferential side wall of the capsule 108 which correspond in number and disposition to groove(s) so as to mate therewith.

When one wishes to raise or lower capsule 108, an optional handle 114 provided at the top of the capsule is grasped and the desired lifting or lowering of the capsule is begun. As the capsule travels vertically it is also rotated by the engagement of the cam follower means, e.g., protrusion (s) 112, with the cam surface means, e.g., groove(s) 110. A beneficial consequence of the rotation of capsule 108 as it is lowered in sleeve 102 is that the cable C is gently coiled beneath the capsule 108 in the manner illustrated in FIG. 2. Such coiling essentially eliminates the likelihood of kinks or bends in the cable which might detrimentally affect the electrical performance of the system 100. Additionally, FIG. 3 reveals that the aforementioned cooperation means include means for holding capsule 108 in an upwardly projecting position when access to the capsule is required for maintenance or other purposes. Suitable means for this purpose may include elongate substantially horizontal portions or "flats" 116 provided at the upper ends of grooves 110.

Referring to FIG. 2, system 100 is preferably sealed at its top by a rigid circular cap 118. The cap 118 and/or sleeve 102 preferably include means (not illustrated) for locking the cap onto the sleeve. For instance, the cap may have radially extendable and retractable fingers operatively connected to a rotatable member such as a bolt. Accordingly, when the bolt is rotated in one direction, the fingers are urged to project into corresponding slots provided in the sleeve and, when the bolt is rotated in the opposite direction, the fingers withdraw from the sleeve thereby permitting removal of the cap.

What is claimed is:

1. An outside plant telecommunications enclosure system comprising:
    a tubular sleeve;
    an electronics containing capsule dimensioned to be slidably received by said sleeve; and
    cooperating means carried by said sleeve and said capsule for enabling selective disposition of said capsule into first and second positions with respect to said sleeve,
    wherein, when disposed in said first position, said capsule projects outwardly from said sleeve and, when disposed in said second position, said capsule is situated completely within said sleeve.

2. The system as defined in claim 1 wherein, when disposed in said first position, said capsule projects outwardly from said sleeve and, when disposed in said second position, said capsule is situated within said sleeve.

3. The system as defined in claim 2 wherein said cooperating means further comprise means for causing rotation of said capsule with said sleeve as said capsule is moved between said first and second positions.

4. The system as defined in claim 3 wherein said means for causing rotation comprise at least one cam surface provided on one of said sleeve and said capsule and at least one cam follower provided on the other of said sleeve and said capsule.

5. The system as defined in claim 4 wherein said at least one cam surface comprises at least one helical groove and said at least one cam follower comprises at least one protrusion adapted to be received within said at least one groove.

6. The system is defined in claim 5 wherein said at least one groove is provided on an interior circumferential surface of said sleeve and said at least one protrusion is provided on an exterior circumferential surface of said capsule.

7. The system as defined in claim 5 wherein said at least one groove has a substantially horizontal portion at an upper end thereof to hold said capsule in said first position.

8. A method for accessing and storing outside plant telecommunications equipment, said method comprising the steps of:

providing a subterranean enclosure;

providing a telecommunications equipment containing capsule received within a sleeve;

raising a telecommunications equipment containing capsule from said subterranean enclosure by cooperating means carried by the sleeve and capsule to provide access to said capsule; and lowering said capsule completely into said subterranean enclosure by said cooperating means carried by the sleeve and capsule to store said capsule.

9. The method as defined in claim 8 further comprising the step of rotating said capsule at least during said step of lowering said capsule.

10. An outside plant telecommunications enclosure system comprising:

a tubular sleeve;

an electronics containing capsule dimensioned to be slidably received by said sleeve; and cooperating means carried by said sleeve and said capsule for enabling selective disposition of said capsule into first and second positions with respect to said sleeve, said cooperating means comprising at least one cam surface disposed on one of said sleeve and said capsule and at least one cam follower disposed on the other of said sleeve and said capsule, wherein said at least one cam surface includes a substantially horizontal portion at an upper end thereof to hold said capsule in said first position.

* * * * *